3,084,100
CHOLERETIC COMPOSITIONS AND METHODS OF USING SAME

Heinz Scheffler and Robert Engelhorn, Biberach an der Riss, Germany, assignors to Dr. Karl Thomae G.m.b.H., Biberach an der Riss, Germany, a corporation of Germany
No Drawing. Filed Mar. 30, 1961, Ser. No. 99,341
10 Claims. (Cl. 167—55)

The invention relates to novel choleretic compositions containing 1-phenyl-pentanol-(1) as the active ingredient. The invention further relates to a method of increasing bile secretion and excretion of bilirubin over prolonged periods of time.

Substances which are able to control bile secretion into the intestines of humans have been known for a long time and are generally classed as "choleretics" or "cholagogues." The choleretics have been further classified by E. Kuppelwieser (Subsidia Medica, vol. 9 (1957), page 41) into (1) hydrocholeretics which increase the liberation of water through the liver; (2) cholaneretics which increase the liberation of bile acids and their derivatives; (3) cholepoetics which increases the liberation of both water and bile acids and their derivatives; and (4) substances which cause contraction of the gall bladder and discharge of the accumulated bile. The cholepoetics are the most important of these groups as they stimulate the general physiological processes of bile secretion, liberating both liquid and solid constituents.

Two compounds which have been suggested as cholepoetic agents are 1-phenyl-propanol-(1) and p-tolyl-methyl-carbinol. However, the stimulative action of these compounds begins to decrease within a relatively short time after their administration.

It is an object of the invention to provide novel choleretic compositions containing 1-phenyl-pentanol-(1) as the active ingredient which have a prolonged activity.

It is a further object to provide a novel method for increasing bile secretion and bilirubin excretion for prolonged periods.

These and other objects and advantages of the invention will become obvious from the following detailed description.

The compositions of the invention are comprised of 1-phenyl-pentanol-(1) and a physiologically acceptable carrier. The compositions cause a high increase in bile secretion and bilirubin excretion over a prolonged period, possess low toxicity and are substantially free from side effects. The compositions may be administered in any convenient manner, such as perorally, intraperitoneally, intraduodenally or per rectum.

The average daily dose of 1-phenyl-pentanol-(1) for humans is usually 100 to 900 mgm., generally about 300 mgm. The daily dose for any particular individual would have to be selected by the physician depending upon the patient's condition.

The daily dose of 1-phenyl-pentanol-(1) can be administered in one or more dosage units containing 50 to 900 mg. of the active ingredient, usually 50 to 300 mg. and preferably 100 mg. The dosage units may be in the form of liquid preparations, such as solutions, dispersions or emulsions, or in solid form, such as coated pills, tablets or capsules.

The physiologically acceptable carrier may be any pharmaceutical carrier convenient for administration, preferably by peroral, intraperitoneal or intraduodenal means. The said carrier may be a solid diluent, such as bees wax, polyethylene glycol or silicon dioxide, a liquid diluent, such as sterile pyrogen-free water, ethanol, aqueous ethanol and 1,2-propylene glycol, or capsule material such as gelatin.

In addition to the physiologically acceptable carrier, the compositions of the invention may also contain sweetening, flavoring, dispersing, wetting, emulsifying and/or thickening agents. For example, suitable emulsifying agents are polyethylene glycol sorbitan monolaurate and certain polyethylene glycols, and carboxymethyl cellulose is a suitable thickening agent. Highly dispersed silica is a satisfactory solid diluent.

The compositions of the invention may also contain other physiologically active compounds in addition to 1-phenyl-pentanol-(1). For example, a spasmolytic is often advantageously added to the compositions to reduce the pain (frequently considerable) associated with gall bladder disorders. Examples of suitable spasmolytics are atropine, papaverine or quaternary ammonium salts as disclosed in copending application Serial No. 68,517, filed November 10, 1960, such as dimethyl-n-octyl-($\beta$-benzilic acid ethyl ester)-ammonium bromide. It is also advantageous to add suitable vitamins to the compositions, such as vitamins of the B-series, in particular nicotinamide or aneurin mononitrate.

The 1-phenyl-pentanol-(1) may be prepared in any convenient manner. Benzaldehyde may be reacted with n-butyl-magnesium bromide, and after purification 1-phenyl-pentanol-(1) is obtained in the form of a colorless oil at room temperature.

The effect of 1-phenyl-pentanol-(1) on blood pressure is very slight. After intravenous administration only a very small drop in blood pressure is observed. The toxicity of 1-phenyl-pentanol-(1) is very low, the $LD_{50}$ in mice being 103° mgm./kg. intraperitoneally and 3100 mgm./kg. perorally.

The activity of 1-phenyl-pentanol-(1) has been compared with the prior art choleretics, p-tolyl-methyl-carbinol and 1-phenyl-propanol-(1), in rats, cats and dogs. In all cases 1-phenyl-pentanol-(1) showed a substantially greater increase in cholerrhagia than p-tolyl-methyl-carbinol. 1-phenyl-propanol-(1) and 1-phenyl-pentanol-(1) caused about the same increase in cholerrhagia, but in the case of 1-phenyl-propanol-(1), the increase began to fall off rapidly after the third or fourth hour until the increase was barely measurable. 1-phenyl-pentanol-(1) caused an increase in cholerrhagia within an average of 20 to 30 minutes after administration and the increase remained approximately constant for over six hours. The amount of solids discharged with the bile was substantially increased and remained almost constant over five hours with 1-phenyl-pentanol-(1), while 1-phenyl-propanol-(1) effected a lower discharge of solids which was scarcely noticeable after five hours.

The compositions and method of the invention are particularly suited for the treatment of diskinesia of the bile ducts, hepatitis, chloecystitis, cholelithiasis, chloecystopathy, post-chloecystectomy syndrome and chronic and acute hepathopathy.

The following examples describe several preferred embodiments to illustrate the invention. However, it should be understood that the invention is not intended to be limited to these specific embodiments. The parts are parts by weight unless otherwise specified.

EXAMPLE I

*Capsules Containing 1-Phenyl-Pentanol-(1)*

Soft No. 2 gelatin capsules were filled with undiluted 1-phenyl-pentanol-(1) by the Scherer Rotary Die process so that each capsule contained 100 mgm. of 1-phenyl-pentanol-(1).

EXAMPLE II

*Capsules Containing 1-Phenyl-Pentanol-(1) and Atropine*

5 parts of beeswax were dissolved in 100 parts of 1-phenyl-pentanol-(1), the solution was heated to 70° C. and was then cooled to 30° C. One part of finely ground atropine sulfate was stirred into the solution and the mixture was used to fill soft No. 2 gelatin capsules by the Scherer Rotary Die process. Each capsule weighed 106 mgm. and contained 100 mgm. of 1-phenyl-pentanol-(1).

EXAMPLE III

*Capsules Containing 1-Phenyl-Pentanol-(1) and Papaverine*

7 parts of beeswax were dissolved in 100 parts of 1-phenyl-pentanol-(1), the solution was heated to about 70° C. and was then cooled to about 30° C. 50 parts of finely ground papaverine hydrochloride were stirred in and the resulting mixture was used to fill soft No. 3 gelatin capsules as before. The capsules weighed 157 mgm. each and contained 100 mgm. of 1-phenyl-pentanol-(1).

EXAMPLE IV

*Solution of 1-Phenyl-Pentanol-(1) for Drops*

5 grams of 1-phenyl-pentanol-(1) and 0.3 gram of peppermint oil were dissolved in 60 cc. of 96% ethanol. 0.2 gram of sodium saccharinate was dissolved in about 40 cc. of distilled water. The aqueous solution was added in small portions to the alcoholic solution while stirring. The final solution had a volume of 100 cc. One cc. of the solution contained 50 mgm. of 1-phenyl-pentanol-(1).

EXAMPLE V

*Emulsion of 1-Phenyl-Pentanol-(1) for Peroral Administration*

20 grams of 1-phenyl-pentanol-(1), 30 grams of polyethylene glycol sorbitan monolaurate, 50 grams of polyethylene glycol 400 and 1 gram of peppermint oil were mixed together. 0.7 gram of p-hydroxybenzoic acid methyl ester, 0.3 gram of p-hydroxy benzoic acid propyl ester, 7 grams of highly viscous carboxymethyl cellulose and 25 grams of cane sugar were dissolved in distilled water at 80° C. and then 1 gram of sodium saccharinate was dissolved in the aqueous solution at 30° C. and 17.5 grams of highly dispersed silicic acid was added to the aqueous solution. The first mixture was then poured into the aqueous suspension with vigorous stirring. After thorough agitation and homogenization of the mixture, an emulsion with a volume of 1000 cc. was obtained. 5 cc. of the emulsion contained 100 mgm. of 1-phenyl-pentanol-(1).

EXAMPLE VI

*Capsules Containing 1-Phenyl-Pentanol-(1), a Spasmolytic and Vitamins*

6 parts of beeswax were dissolved in 50 parts of 1-phenyl-pentanol-(1) and the solution was heated to 70° C. 10 parts of dimethyl-n-octyl-($\beta$-benzilic acid ethyl ester)-ammonium bromide were dissolved in an additional 50 parts of 1-phenyl-pentanol-(1) and the solution was heated to 50° C. The two solutions were mixed and cooled to about 30° C. Then 5 parts of finely ground aneurin mononitrate and 15 parts of finely ground nicotinamide were stirred into the mixture. The suspension was used to fill soft No. 3 gelatin capsules to obtain capsules weighing 136 mgm. each. The capsules contained 100 mgm. of 1-phenyl-pentanol-(1) each.

EXAMPLE VII

*Capsules Containing 1-Phenyl-Pentanol-(1) and a Spasmolytic*

20 parts of dimethyl-n-octyl-($\beta$-benzilic acid ethylester)-ammonium bromide were dissolved in 100 parts of 1-phenyl-pentanol-(1) at about 50° C. and the solution was then cooled to about 30° C. Soft No. 2 gelatin capsules were filled with the solution. Each capsule weighed 120 mg. and contained 100 mg. of 1-phenyl-pentanol-(1).

EXAMPLE VIII

*Capsules Containing 1-Phenyl-Pentanol-(1) and a Wetting Agent*

5 parts of N-($\beta$-hydroxyethyl)-N-($\beta,\gamma$-dihydroxy- propyl)-dodecylamine were dissolved in 100 parts of 1-phenyl-pentanol-(1) and the solution was used to fill soft size 2 gelatin capsules. Each capsule weighed 125 mg. and contained 100 mg. of 1-phenyl-pentanol-(1).

Instead of the above amine other wetting agents, such as fatty alcohol sulfonates, bile acids, polyethylene glycol ethers, etc., may be used in the capsules.

EXAMPLE IX

*Solutions of 1-Phenyl-Pentanol-(1) for Intraduodenal Use*

A. 1,2-propylene glycol was used to dissolve 1-phenyl-pentanol-(1) so that there was 1 gram of 1-phenyl-pentanol-(1) in 10 cc. of solution.

B. 0.02 gram of peppermint oil, 0.2 gram of dimethyl-n-octyl-($\beta$-benzilic acid ethyl ester)-ammonium bromide and 1 gram of 1-phenyl-pentanol-(1) were dissolved in sufficient 1,2-propylene glycol to form 10 cc. of solution.

C. 0.02 gram of peppermint oil, 0.05 gram of N-($\beta$-hydroxyethyl)-N-($\beta,\gamma$-dihydroxypropyl)-dodecylamine and 1 gram of 1-phenyl-pentanol-(1) were dissolved in sufficient 1,2-propylene glycol to form 10 cc. of solution.

EXAMPLE X

*Coated Pills of 1-Phenyl-Pentanol-(1)*

100 parts of 1-phenyl-pentanol-(1) were dissolved in 100 parts of ethanol and 100 parts of colloidal silicium-dioxide were kneaded into the solution. 65 parts of corn starch and 19 parts of lactose were added to the solution followed by addition of a 50% aqueous solution of 100 parts of sugar. The resultant mixture was thoroughly kneaded and granulated and then dried at 50° C.

10 parts of dimethyl-n-octyl-($\beta$-benzilic acid ethyl ester)-ammonium bromide, 6 parts of vitamin $B_1$-mononitrate and 16.5 parts of nicotinic acid amide were mixed together and the mixture was granulated with a 10% solution of 1 part of carbowax 6000 and 1 part of tartaric acid in ethanol. The granulate was dried at 40° C.

The two granulates were mixed with 1 part of magnesium stearate and the mixture was pressed into pill cores having an 11 mm. diameter and weighing 420 mg. each. The pill cores were coated with a thin candy coating consisting of sugar and talcum. The finished pills were polished with a mixture of beeswax and carnauba wax. Each coated pill weighed 750 mg. and contained 100 mg. of 1-phenyl-pentanol-(1).

EXAMPLE XI

*Pharmacological Comparison*

1-phenyl-pentanol-(1) was compared with 1-phenyl-propanol-(1) and p-tolyl-methyl-carbinol by administering intraduodenally to animals 100 mg. of the compounds per kg. of body weight. The animals were subjected to narcosis with urethane or Numal. A cannula was fastened into the ductus choledochus and the number of drops flowing out was measured with a drop measurer every hour for two hours before and four to six hours after the administration of the compound. The percentage raising or lowering of the drop count or solids secreted with the bile was compared with the control. The results are shown in the following tables.

RESEARCH ON RATS

| Substance | Raising of the bile secretation in percent against the control value after— | | | | | |
|---|---|---|---|---|---|---|
| | 60 Minutes | 120 Minutes | 180 Minutes | 240 Minutes | 300 Minutes | 360 Minutes |
| 1-Phenyl-pentanol-(1) | +67 | +72 | +71 | +72 | +59 | +55 |
| 1-Phenyl-propanol-(1) | +71 | +62 | +39 | +19 | +5 | −10 |
| p-Tolyl-methyl-carbinol | +33 | +17 | 0 | −5 | −14 | −17 |

RESEARCH ON CATS

| Substance | Raising of the bile secretion in percent against the control value after— | | | | |
|---|---|---|---|---|---|
| | 60 Minutes | 120 Minutes | 180 Minutes | 240 Minutes | 300 Minutes |
| 1-Phenyl-pentanol-(1) | +105 | +108 | +152 | +104 | +92 |
| 1-Phenyl-propanol-(1) | +118 | +74 | +63 | +63 | not measured |

RESEARCH ON DOGS

| Substance | Raising of the solids secreted with the bile in percent against control value after— | | | |
|---|---|---|---|---|
| | 60 Minutes | 120 Minutes | 180 Minutes | 270 Minutes |
| 1-Phenyl-pentanol-(1) | +240 | +198 | +175 | +153 |
| 1-Phenyl-propanol-(1) | +69 | +51 | +86 | +31 |

The above pharmacological results were confirmed in humans by clinical trials in several hospitals of the Federal Republic of Germany. A prolonged choleretic action was noticed in many patients without any substantial side-effects. In one case the bile flow was increased 1500%. In general a marked increase of bilirubin secretion was also observed.

Various modifications of the method and/or the compositions of the invention may be made without departing from thes pirit or scope thereof, and it is to be understood that the invention be limited only as defined in the appended claims.

We claim:

1. A novel composition for increasing bile secretion and bilirubin excretion for prolonged periods, comprising from 50 to 900 mgm. of 1-phenyl-pentanol-(1), a physiologically acceptable carrier, a spasmolytic and a vitamin of the B group.

2. The composition of claim 1 wherein the spasmolytic is selected from the group consisting of atropine, papaverine and dimethyl-n-octyl-(β-benzilic acid ethyl ester)-ammonium bromide.

3. The composition of claim 1 wherein the vitamin of the B group is selected from the group consisting of nicotinic acid amide and aneurin mononitrate.

4. A novel composition for increasing bile secretion and bilirubin excretion for prolonged periods by peroral administration, consisting essentially of coated pills containing 50 to 300 milligrams of 1-phenyl-pentanol-(1), vitamin of the B group, dimethyl-n-octyl-(β-benzilic acid ethyl ester)-ammonium bromide and a physiologically acceptable solid carrier.

5. A novel composition for increasing bile secretion and bilirubin for prolonged periods by intraduodenal administration consisting essentially of a solution of 50 to 900 milligrams of 1-phenyl-pentanol-(1), a vitamin of the B group, dimethyl-n-octyl-(β-benzilic acid ethyl ester)-ammonium bromide and N-(β-hydroxyethyl)-N-(β,γ-dihydroxypropyl)-dodecylamine in 1,2-propylene glycol.

6. A novel peroral composition for increasing bile secretion and bilirubin excretion for prolonged periods consisting essentially of a solution of 50 to 900 milligrams of 1-phenyl-pentanol-(1), a vitamin of the B group and dimethyl-n-octyl-(β-benzilic acid ethyl ester)-ammonium bromide in ethanol.

7. A method for increasing bile secretion and bilirubin excretion for prolonged periods in animals and humans which comprises administering to the subject daily an effective amount of 1-phenyl-pentanol-(1).

8. The method of claim 7 wherein 100 to 900 milligrams of 1-phenyl-pentanol-(1) are administered to the patient.

9. A method for increasing bile secretion and bilirubin excretion for prolonged periods and reducing pain associated with gall bladder disorders in animals and humans which comprises administering daily to the subject an effective amount of 1-phenyl-pentanol-(1) and a spasmolytic.

10. The method of claim 9 wherein the spasmolytic is selected from the group consisting of papaverine, atropine and dimethyl-n-octyl-(β-benzilic acid ethyl ester)-ammonium bromide.

References Cited in the file of this patent

Chemical Abstracts, 5th Decennial Index, subjects B–Bz, 1947–1956, p. 1848s.